(12) United States Patent
Zellweger et al.

(10) Patent No.: US 11,089,022 B2
(45) Date of Patent: Aug. 10, 2021

(54) DECENTRALIZED SPARSE CAPABILITY SYSTEM WITH SECURE ENCLAVES

(71) Applicant: VMware, Inc., Palo Alto, CA (US)

(72) Inventors: Gerd Zellweger, Mountain View, CA (US); Stanko Novakovic, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 381 days.

(21) Appl. No.: 16/278,352

(22) Filed: Feb. 18, 2019

(65) Prior Publication Data

US 2020/0267152 A1 Aug. 20, 2020

(51) Int. Cl.
*H04L 29/06* (2006.01)
*G06F 21/62* (2013.01)
*G06F 12/14* (2006.01)
*G06F 21/60* (2013.01)

(52) U.S. Cl.
CPC .......... *H04L 63/10* (2013.01); *G06F 12/1408* (2013.01); *G06F 12/1441* (2013.01); *G06F 12/1475* (2013.01); *G06F 21/604* (2013.01); *G06F 21/6218* (2013.01); *H04L 63/0428* (2013.01); *G06F 2221/2141* (2013.01)

(58) Field of Classification Search
CPC . H04L 63/10; H04L 63/0426; H04L 63/0428; G06F 21/604; G06F 21/6218; G06F 2221/2141

USPC .......................................................... 726/21
See application file for complete search history.

(56) References Cited

U.S. PATENT DOCUMENTS 10,325,118 B2 * 6/2019 Chhabra ............... H04L 9/3242
2006/0117090 A1 * 6/2006 Schellingerhout ...... G06F 21/10
709/217

OTHER PUBLICATIONS

Constan et al., "Intel SGX Explained", Computer Science and Artificial Intellegence Laboratory, Massachusetts Institute of Technology.

(Continued)

*Primary Examiner* — Longbit Chai
(74) *Attorney, Agent, or Firm* — Patterson + Sheridan, LLP

(57) ABSTRACT

The present disclosure provides an approach for granting access to a resource located on a first server, the granting being done by a second server to a third server. The method results in a decentralized granting of access to a resource, preventing a bottleneck in the first server that could develop if the first server were to grant each access to each of its resources. The access is provided in the form of an encrypted capability, and transmitted through a secure channel. The code on the second server for granting access is located within an encrypted memory region, such that unauthorized processes cannot access the code or the data within the encrypted memory region.

20 Claims, 3 Drawing Sheets

(56) References Cited

OTHER PUBLICATIONS

"Software Guard Extentions", https://en.wikipedia.org/wiki/Software_Guard_Extensions.
McKeen et al., "Innovative Instructions and Software Model for Isolated Execution", Intel Corporation, Published Aug. 14, 2013.
Mullender et al., "The Design of a Capability-Based Distributed Operating System", The Computer Journal, vol. 29, Issue 4, Jan. 1, 1986, pp. 289-299.
Giligor et al., "Object Migration and Authentication", IEEE Transactions on Software Engineering, vol. SE-5, Issue 6, Nov. 1979, pp. 607-611.
Vochteloo et al., "Capability-Based Protection in the Mungi Operating System", School of Computer Science and Engineering, University of New South Wales, NSW Australia 2033, Jul. 23, 1993.

\* cited by examiner

DECENTRALIZED SPARSE CAPABILITY SYSTEM WITH SECURE ENCLAVES

BACKGROUND

Servers may share their resources with other servers. For example, a first server may grant access to a region of its memory to a second server by providing the second server with a handle to the region of memory. The second server may then wish to provide access to a sub-region of the memory to a third server. Typically, this would require the second or third server to request another handle to the sub-part of the region from the first server. If, for example, the first server is a database, the other servers are clients, and thousands of such client servers exist, then an efficiency issue may arise because the first server may have to process a large number of requests. The issue may be that the first server may become a bottleneck within the centralized process of granting access to resources to other servers.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for granting access to a resource located on a first server, the granting being done by a second server to a third server. The method results in a decentralized granting of access to a resource, preventing a bottleneck in the first server that could develop if the first server were to grant each access to each of its resources. Accordingly, embodiments described herein improve the functioning of a computing system, in that granting of access to resources is distributed among servers, instead of being centralized in a single server, thereby reducing the compute resources needed/used on the first server. Certain embodiments further solve a computer-centric problem of granting resources in a secure manner, while avoiding bottlenecks.

Figure 1:
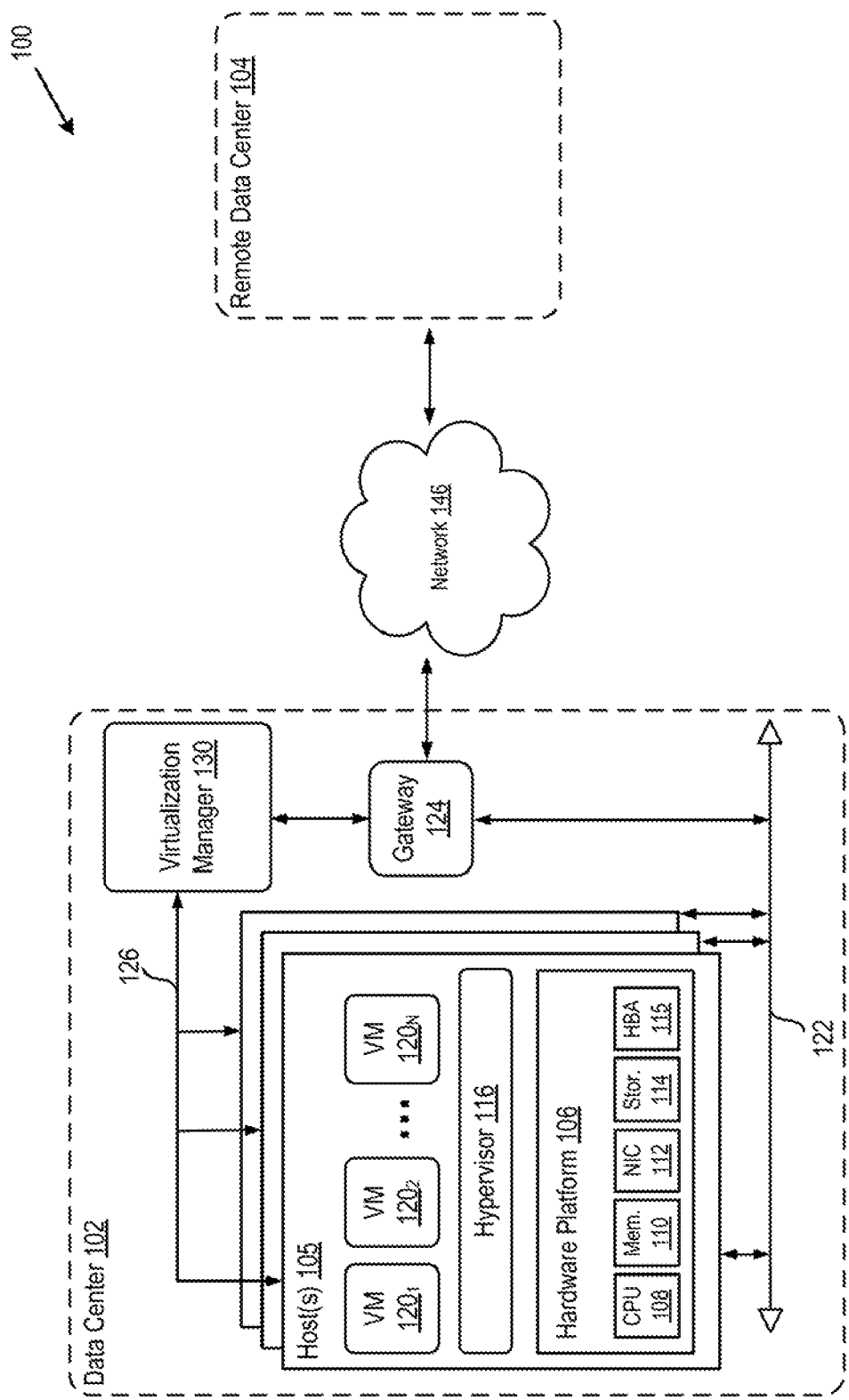
FIG. 1 depicts a first block diagram of a computer system in which one or more embodiments of the present disclosure may be utilized, according to an embodiment.

FIG. 1 depicts a block diagram of a computer system 100 in which one or more embodiments of the present disclosure may be utilized, according to an embodiment. As shown, computer system 100 includes data center 102 and a remote data center 104, connected by a network 146. Remote data center 104 may be substantially similar to data center 102. Network 146 may be, for example, a direct link, a local area network (LAN), a wide area network (WAN) such as the Internet, another type of network, or a combination of these.

Data center 102 includes host(s) 105, a virtualization manager 130, a gateway 124, a management network 126, and a data network 122. Each of hosts 105 may be constructed on a server grade hardware platform 106, such as an x86 architecture platform. For example, hosts 105 may be geographically co-located servers on the same rack. Host 105 is configured to provide a virtualization layer or virtualization system/software, also referred to as a hypervisor 116, that abstracts processor, memory, storage, and networking resources of hardware platform 106 into multiple virtual machines $120_1$ to $120_N$ (collectively referred to as VMs 120 and individually referred to as VM 120) that run concurrently on the same host. Hypervisor 116, through abstraction, implements or emulates virtualized components of VM 120. Hypervisor 116 is logically interposed between VMs 120 and hardware platform 106. One example of hypervisor 116 is a VMware ESXi™ hypervisor provided as part of the VMware vSphere® solution made commercially available from VMware, Inc. of Palo Alto, Calif. Hypervisor 116 may run on top of the operating system in host 105 or directly on hardware platform 106 of host 105. Although certain aspects are described with respect to VMs, it should be noted that the techniques discussed herein may similarly be applied to other types of virtual computing instances (VCIs) such as containers.

Hardware platform 106 of each host 105 may include components of a computing device such as one or more processors (CPUs) 108, system memory 110, a network interface 112, storage system 114, a local host bus adapter (HBA) 115, and other I/O devices such as, for example, a mouse and keyboard (not shown).

CPU 108 is configured to execute instructions, for example, executable instructions that perform one or more operations described herein and that may be stored in memory 110 and in storage 114. Network interface 112 enables host 105 to communicate with other devices via a communication medium, such as network 122 or network 126. Network interface 112 may include one or more network adapters, also referred to as Network Interface Cards (NICs). Storage system 114 represents local persistent storage devices (e.g., one or more hard disks, flash memory modules, solid state disks, and/or optical disks). HBA 115 couples host 105 to one or more external storages (not shown), such as a storage area network (SAN). Other external storages that may be used include network-attached storage (NAS) and other network data storage systems, which may be accessible via MC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random-access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with hosts 105 via a network, shown as a management network 126, and carries out administrative tasks for data center 102 such as managing hosts 105, managing local VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a VM in one of hosts 105. One example of a virtualization manager is the vCenter Server™ product made available from VMware, Inc.

In one embodiment, virtualization manager 130 includes a hybrid cloud management module (not shown) configured to manage and integrate virtualized computing resources provided by remote data center 104 with virtualized computing resources of data center 102 to form a unified computing platform. The hybrid cloud manager module is configured to deploy VMs in remote data center 104, transfer VMs from data center 102 to remote data center 104, and perform other "cross-cloud" administrative tasks. In one implementation, hybrid cloud manager module is a plug-in complement to virtualization manager 130, although other implementations may be used, such as a separate computer program executing in a central server or running in a VM in one of hosts 105. One example of hybrid cloud manager module is the VMware vCloud Connector® product made available from VMware, Inc.

Gateway 124 (e.g., executing as a virtual appliance) provides VMs 120 and other components in data center 102 with connectivity to network 146 used to communicate with remote data center 104. Gateway 124 may manage external public IP addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Although networks 122 and 126 are shown as separate entities, they may be implemented by shared physical networking components.

Figure 2:
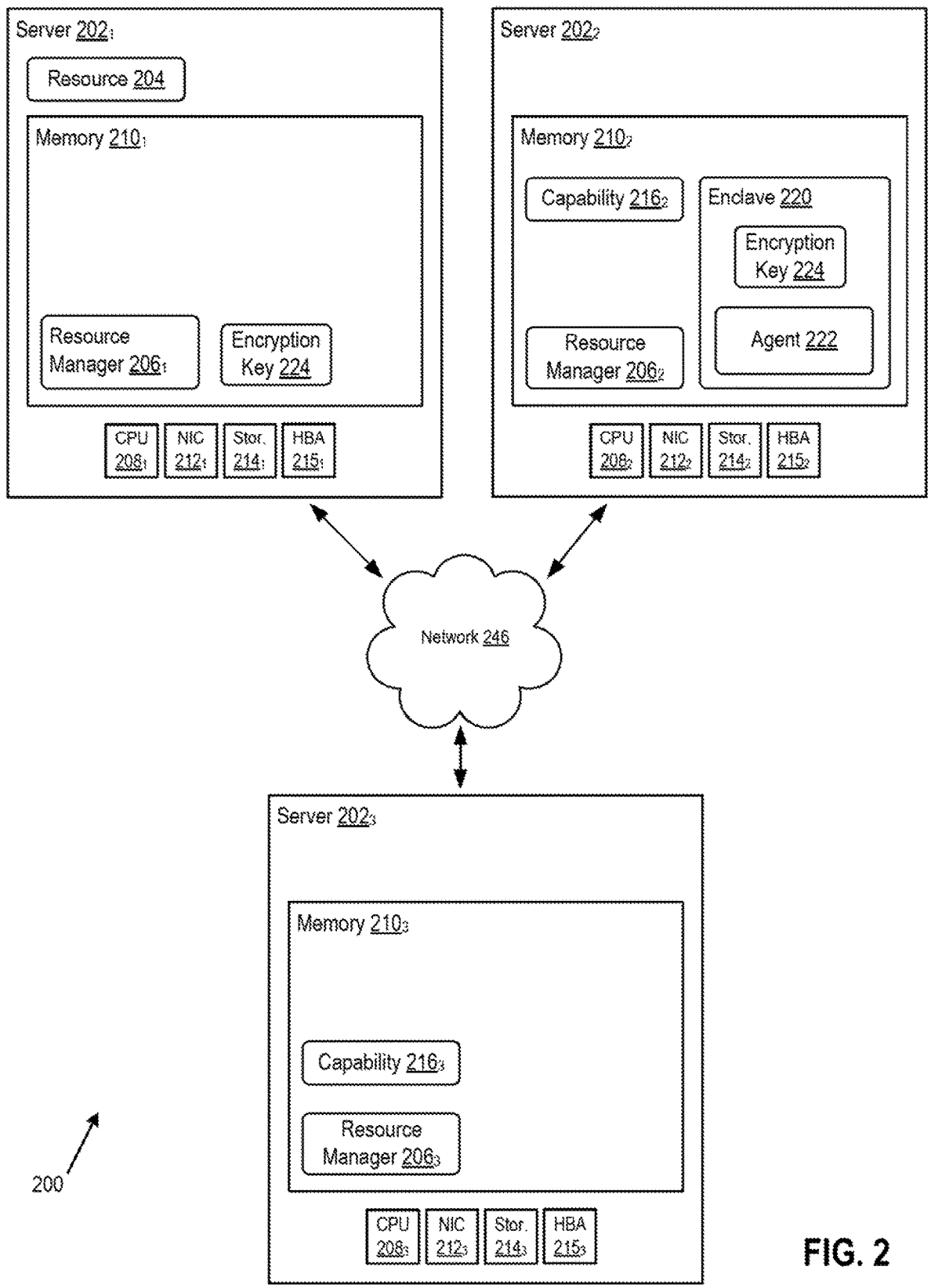
FIG. 2 depicts a second block diagram of a computer system in which one or more embodiments of the present disclosure may be utilized, according to an embodiment.

FIG. 2 depicts a second block diagram of a computer system 200 in which one or more embodiments of the present disclosure may be utilized, according to an embodiment. System 200 comprises a plurality of servers 202 connected by network 246. Network 246 may be network 126, 122, or 146 shown in FIG. 1, or network 246 may be a combination of these and/or other networks. Although FIG. 2 shows three servers 202, any number of servers 202, two or more, is possible within system 200. Server 202 may be one of hosts 105 or VMs 120 shown in FIG. 1. If server 202 is a VM 120, then each hardware component (memory, CPU, MC, storage, HBA, etc.) of that server 202 is actually a virtualized component, such as virtualized through hypervisor 116 running on physical host 105. If server 202 is a VM 120, then each server may be on the same host 105 or on different hosts 105. Each server 202 may be within the same data center 102, or may be located within a plurality of data centers, such as data center 102 and 104, and/or other data centers.

Each server 202 comprises hardware components or virtualized hardware components CPU 208, memory 210, and MC 212. A server may optionally also comprise other hardware or virtualized hardware components, such as storage 214 and HBA 215. Components 208, 210, 212, 214, and 215 may be substantially similar to components 108, 110, 112, 114, and 115 described in FIG. 1.

Each server 202 comprises resources, such as resource 204 shown on server $202_1$. Resource 204 is shown only on server 202 for brevity, but each server 202 may have one or more resources, such as resource 204. Resource 204 may be any shareable resource present on server 202, such as some or all memory $210_1$, a file within memory $210_1$, a network socket, some or all disk blocks of storage 114, space of a field-programmable gate array (FPGA), an interrupt vector, etc. Resource 204 may be divisible, meaning that resource 204 may be divided into two or more parts, such that each part can be individually shared with other servers 202. For example, resource 204 may be a region of memory $210_1$, while a smaller portion of the region of memory $210_1$ may be a shareable, accessible sub-part resulting from dividing of resource 204. Resource 204 may be associated with a set of rights. For example, resource 204 may be a region of memory $210_1$ and associated with rights such as reading from and writing to resource 204. Each resource in system 200 may have an owner, such as for example, server $202_1$ or resource manager $206_1$ may be the owner of resource 204 because resource 204 is located on server $202_1$.

Resource 204 may be shareable by the owning server 202 with a second server 202 by providing to the second server a capability 216 associated with resource 204. Capability 216 functions as a key, the key having been generated by the owner of resource 204 or by an agent 222 of the owner of resource 204. The key, when presented to the owner of resource 204, allows the holder of the key to exercise rights associated with the key, the exercise of those rights being on the resource or the portion of the resource associated with the key. For example, a capability for memory 210, a file within memory 210, or a network socket may be a file handle, a memory handle, or a socket identifier, respectively. For another example, a capability for disk blocks of storage 114 may be a handle indicating the blocks of storage 114, a capability for space of an FPGA may be a handle indicating the region of FPGA space, and a capability for an interrupt may be an identifier of the interrupt vector number.

To illustrate, resource 204 may be a portion of memory $210_1$, and capability $216_2$ to resource 204 may comprise a base address and a length, indicating the portion of memory $210_1$ that is represented by resource 204. Capability $216_2$ to resource 204 may be held by server $202_2$. Capability $216_2$ may also be associated with a set of rights, such as read-only, write-only, or both read and write. A capability to read and write to a portion of memory $210_1$ may be a string, such as "[base address, length, r, w]". To illustrate, if the set of rights is both read and write, then when server $202_2$ presents capability $216_2$ to server $202_1$, then server $202_1$ allows server $202_2$ to read from and write to the portion of memory $210_1$ represented by resource 204.

Capability 216 may be encrypted for security purposes. Capability 216 may be encrypted by the owner of the resource to which the capability 216 applies, or capability 216 may be encrypted by agent 222 of the owner. Capability 216 may be encrypted by encryption key 224 maintained by the owner of encryption key 224 or by agent 222 of the owner of encryption key 224. The term "sparse" may be used to refer to a capability that is an "encrypted" capability. When capability 216 is transmitted from one server 202 to another server 202, the capability may be transmitted using a secure channel. The secure channel may include point-to-point encryption techniques, such as those of Internet Protocol Security (IPSec).

Encryption key 224 is a private encryption key 224 accessible only to the owner of the resource 204 for which capabilities are being encrypted by encryption key 224. Encryption key 224 may be stored within an encrypted area of memory 210 or storage 214. Encryption key 224 is used both to encrypt and decrypt capability 216. That is, the same encryption key 224 is used to both encrypt and decrypt capability 216. In an embodiment, each server 202 has at least one encryption key 224 owned by that server 202. The encryption key is stored on server 202 that owns the encryption key 224. Encryption key 224 may also be maintained by agent 222 within a non-owner server 202, as further discussed below. Encryption key 224 is a private key and is only accessible to server $202_1$ or to an agent of server $202_1$ executing on another server 202. For example, encryption key 224 is not available to or accessible by the operating system of server $202_2$ or $202_3$.

Resource manager 206 is a component executing within each server 202. Resource manager 206 manages resources (e.g., resource 204), division of resources, access to resources, and generation of capabilities to resources, for resources located on the same server 202 as the server 202 on which resource manager 206 is located. Resource manager 206 may be a component within an operating system of server 202.

For example, to grant capability $216_2$ associated with resource 204 to another server $202_2$, resource manager $206_1$ creates capability $216_2$, encrypts capability $216_2$ using encryption key 224 on server $202_1$, and transmits capability $216_2$ through a secure channel to destination server $202_2$. Components, such as applications, on server $202_2$ may then use the granted capability $216_2$ to access resource 204. When a component on destination server $202_2$ would like to access resource 204, server $202_2$ may send an operation, such as an input/output (I/O) operation, to the resource-owner server $202_1$, the operation including capability $216_2$. When owner server $202_1$ receives the operation, server $202_1$ validates capability $216_2$ by (a) successfully decrypting capability $216_2$ using key 224, or (b) cryptographically verifying a signature embedded in capability $216_2$ using key 224. Then, owner server $202_1$ determines whether capability $216_2$ allows the operation to the resource. If so, then server $202_1$ executes the operation, and if not, then server $202_1$ does not execute the operation.

Once capability $216_2$ has been granted and transmitted to server $202_2$, server 202 may transmit capability $216_2$ to another server $202_3$, and server $202_3$ will then be able to access resource 204 using capability $216_2$ the same way as server $202_2$ can, as described above. However, server $202_2$ may want to grant an attenuated, limited, or restricted version of capability $216_2$ to server $202_3$. An "attenuated," "limited," or "restricted" capability of another capability is (a) a capability to a subpart of the other capability, and/or (b) a capability with rights that are more restricted than the rights of the other capability. For example, server $202_2$ may want to grant capability 216 to a sub-part of resource 204, may want to grant capability 216 with more restricted rights to resource 204 as compared to capability $216_2$, or both. Such an attenuated capability 216 may be granted by agent 222 executing within server $202_2$.

Agent 222 within server $202_2$ is an agent of resource manager $206_1$ or generally of server $202_1$. The code of agent 222 is placed on server $202_2$ by server $202_1$ within an encrypted memory region or secure enclave 220 of server $202_2$. Along with placing the code of agent 222 within enclave 220, server $202_1$ also places one or more of its encryption keys 224 within enclave 220 for the use of agent 222 for encrypting and decrypting capabilities 216 that are associated with a resource on server 202, such as resource 204. In an embodiment, agent 222 is a user-level process. As used herein, a user-level process is a process that runs outside of a privileged kernel of operating system of server 202 on which the process is executing. Agent 222 grants attenuated capabilities based on capabilities 216 already granted to its host server (e.g., server $202_2$). For example, if a first capability 216 to a region of memory $210_1$ has been granted to server $202_2$, then the code of agent 222 has permission to grant an attenuated capability to that region of memory $210_1$, such as a capability 216 to a sub-part of the memory region and/or a capability 216 with more restricted rights than the first capability 216. In another embodiment, rather than only being able to grant attenuated capabilities based on previously granted capabilities by resource manager $206_1$, agent 222 may grant initial capabilities to the same extent as resource manager $206_1$ of which agent 222 is an agent. Agent 222 may be established on server $202_2$ before any capability 216 is granted, such as upon boot up of server $202_2$ and/or server $202_1$, or agent 222 may be established on server $202_2$ upon receipt of capability $216_2$ on server $202_2$, or upon a determination by one of servers 202 that an attenuated capability 216, as compared to granted capability $216_2$, is to be granted or is likely to be granted.

Although only one agent 222 is shown in FIG. 2, in an embodiment, each server 202 of FIG. 2 may have one or more agents of other servers 202 executing within each server. For example, server $202_3$ may have an agent of server $202_1$ executing within an enclave of memory $210_3$, and an agent of server $202_2$ executing within a separate enclave of memory $210_3$. Server $202_1$ may have an agent of server $202_2$ executing within an enclave of memory $210_1$, and agent of server $202_3$ executing within a separate enclave of memory $210_1$. And server $202_2$ may have a second agent of server $202_3$ executing within an enclave separate from enclave 220 shown in FIG. 2. Each agent may have similar or same functionality as that of agent 222, but with respect to the server for which the agent is an agent. Each agent may also maintain, within its enclave, one or more encryption keys of the server 202 for which the agent is an agent.

Enclave 220 is a memory region that is either inaccessible to the operating system of server 202 on which the enclave is located, or if accessible, then the operating system of that server 202 perceives data within enclave 220 as random data. Code executing within enclave 220 and data located within enclave 220 are protected from processes executing outside of enclave 220, even if the other processes are running at higher privilege levels. Enclave 222 may be implemented through a hardware mechanism, such as through the set of CPU instruction codes (i.e., extensions) that are part of Intel Software Guard Extensions (SGX). For example, an SGX-enabled CPU 208 may protect the integrity and confidentiality of the computation inside enclave 222 by isolating the enclave's code and data from the outside environment, including the operating system and hypervisor of server 202, and hardware devices attached to the system bus of server 202. When using the SGX model, execution flow can only enter enclave 222 via special CPU instructions. In the SGX model, enclave execution always happens in a protected mode, and uses the address translation set up by the operating system kernel and hypervisor. Additional information on implementing enclave 222 using Intel SGX can be found in McKeen et al., Innovative Instructions and Software Model for Isolated Execution, HASP '13 Proceedings of the 2nd International Workshop on Hardware and Architectural Support for Security and Privacy, Article No. 10, Jun. 23-24, 2013.

Figure 3:
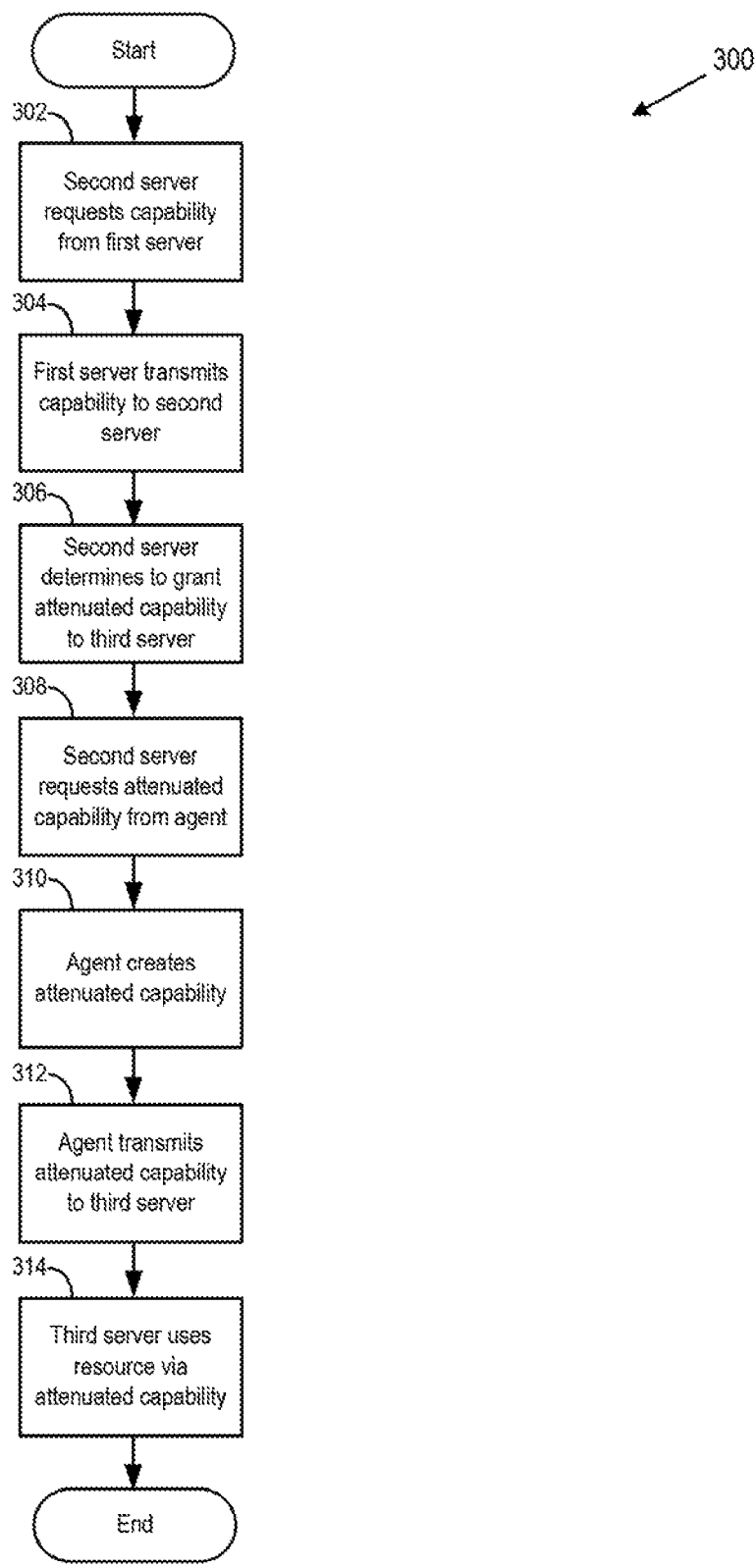
FIG. 3 depicts a flow diagram of a decentralized method of granting an attenuated capability, according to an embodiment.

FIG. 3 depicts a flow diagram of a decentralized method of granting an attenuated capability, according to an embodiment. At block 302, server $202_2$ initiates method 300 by requesting capability $216_2$ to resource 204 from server $202_1$ (or from resource manager $206_1$). It should be noted that rather than server $202_2$ initiating method 300 by requesting capability $216_2$, method 300 may be initiated by server 202 deciding to grant capability $216_2$ to server $202_2$ without a request from server 202, or the determination to grant capability $216_2$ may be made by a different server 202 or by a component not shown in FIG. 2.

At block 304, server $202_1$ or resource manager $206_1$ creates capability $216_2$, the capability being to resource 204 located on server $202_1$. Server $202_1$ or resource manager $206_1$ encrypts capability $216_2$. Server $202_1$ transmits capability $216_2$ to server $202_2$, such as through a secure channel, and server $202_2$ receives and stores capability $216_2$, such as within memory $210_2$ or storage $214_2$.

As described above with reference to FIG. 2, in an embodiment in which agent 222 may perform substantially all functions of resource manager $206_1$, blocks 302 may be performed by agent 222 executing on server $202_2$, in which case the transmitting of block 304 is unnecessary.

At block 306, server $202_2$ decides to grant attenuated capability $216_3$ to server $202_3$, the attenuated capability $216_3$ being an attenuated version of capability $216_2$. The determination to grant capability to $216_3$ may be made by any server 202 with authority to do so, or by another component of system 200 not shown on FIG. 2. If a component other than server $202_2$ makes the determination, then a command may be transmitted to server $202_2$ to grant attenuated capability $216_3$.

At block 308, server $202_2$ or resource manager $206_2$ contacts agent 222 to create attenuated capability $216_3$. Capability $216_3$ is a capability to a sub-part of resource 204 and/or has restricted rights as compared to capability $206_2$. As described above, agent 222 may be instantiated on server 202 in response to the determination of block 306, in response to capability $216_2$ being received at block 304, or prior to any capability having been generated, such as at boot up of server $202_1$ and/or $202_2$.

At block 310, agent 222 creates capability $216_3$, an attenuated version of capability $216_2$. Agent 222 may create capability $216_3$ by first decrypting capability $216_2$ using one or more encryption key(s) 224, which is the same one or more encryption key(s) 224 that is on server $202_1$, and that was used to encrypt capability $216_2$. Agent 222 checks decrypted capability $216_2$ to determine its boundaries and limitations, such as beginning and end, and such as which rights are associated with capability $216_2$. Based on the determined boundaries, agent 222 creates attenuated capability $216_3$ to the same resource 204 as capability $216_2$ but with attenuated boundaries and/or limitations, such as with access to a sub-part of resource 204 or with restricted rights to resource 204. Agent 222 then optionally encrypts capability $216_3$ using encryption key 224 provided to agent 222 by server $202_1$. Capability $216_3$ to resource 204 is created by agent 222 without utilizing CPU $208_1$ of server $202_1$.

At block 312, agent 222 or generally server $202_2$ transmits capability $216_3$ to server $202_3$, such as through a secure channel, substantially in the same way as capability $216_2$ was transmitted from server $202_1$ to server $202_2$ at block 304. As described above, in response to receiving capability $216_3$, an agent of server $202_1$ may be created within an enclave on server $202_3$, such as by server $202_3$ requesting an agent of server $202_1$ to be created on server $202_3$. Or, an agent of server $202_1$ may have already been executing on server $202_3$ upon receipt of capability $216_3$.

At block 314, server $202_3$ sends an operation to access resource 204 to server $202_1$, the operation including capability $216_3$. Server $202_1$ receives the operation and validates capability $216_3$ using encryption key 224, such as by (a) successfully decrypting capability $216_3$ using key 224, or (b) cryptographically verifying a signature embedded in capability $216_3$ using key 224. If capability is not valid, then the operation is not performed. If the operation is valid, then server $202_1$ checks whether the boundaries and limitations of capability $216_3$ allow the operation received from server $202_3$. If so, then server $202_1$ performs the received operation on resource 204, and if not, then server $202_1$ does not perform the operation. In an embodiment, block 314 is performed without server $202_2$. That is, CPU $208_2$ of server $202_2$ is not utilized during execution of block 314.

It should be noted that after block 314, server $202_3$ may then grant a further attenuated capability 216 of capability $216_3$ to a fourth server (not shown) by doing a second iteration of method 300 starting at block 306. In the second iteration, server $202_3$ performs the functions of server $202_2$ of the first iteration, a fourth server (not shown) performs the functions of server $202_3$ of the first iteration, and server $202_1$ performs its own functions of the first iteration. The agent granting a further attenuated capability 216 is located in an enclave on server $202_3$, and is an agent of server $202_1$. Method 300 may loop this way indefinitely, with servers 202 granting each other attenuated capabilities without utilizing CPU $208_1$ of resource-owning server $202_1$, resulting in a decentralized method of granting attenuated capabilities and preventing a bottleneck from developing at server $202_1$.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of granting a first attenuated capability, the method comprising:
   providing, by a first server to a different second server, a first capability associated with a resource located on the first server;
   creating the first attenuated capability by an agent of the first server instantiated on the second server, which executes within a secure enclave of a memory of the second server, wherein the first attenuated capability is an attenuated version of the first capability, and wherein the secure enclave is protected from processes executing outside of the secure enclave;
   transmitting, by the second server to a separate third server, the first attenuated capability associated with the resource; and
   transmitting, by the third server to the first server, the first attenuated capability so as to access the associated resource by the third server.

2. The method of claim 1, wherein the first attenuated capability is an encrypted attenuated capability, the method further comprising encrypting the first attenuated capability, by the agent, using an encryption key of the first server.

3. The method of claim 2, further comprising, validating by the first server the first attenuated capability by using the encryption key.

4. The method of claim 1, wherein the resource is a region of memory, a file, a network socket, a region of storage, an interrupt vector, or space of a field-programmable gate array (FPGA).

5. The method of claim 1, wherein the agent is instantiated on the second server upon boot up of both the first server and the second server.

6. The method of claim 1, wherein data within the secure enclave cannot be accessed by an operating system of the second server.

7. The method of claim 1, wherein the creating does not use a processor of the first server.

8. The method of claim 1, further comprising
   creating a second attenuated capability by a separate second agent of the first server instantiated on the third server, which executes within a separate second secure enclave of a separate second memory of the third server, wherein the second attenuated capability is an attenuated version of the first attenuated capability, and wherein the second secure enclave is protected from processes executing outside the second secure enclave;
   transmitting, by the third server to a separate fourth server, the second attenuated capability associated with the resource; and
   transmitting, by the fourth server to the first server, the second attenuated capability so as to access the associated resource by the fourth server.

9. A non-transitory computer readable storage medium comprising instructions to be executed in a physical processor of a computer system, the instructions when executed in the physical processor cause the computer system to carry out a method of granting a first attenuated capability, the method comprising:

provided, by a first server to a different second server, a first capability associated with a resource located on the first server;

creating the first attenuated capability by an agent of the first server instantiated on the second server, which executes within a secure enclave of a memory of the second server, wherein the first attenuated capability is an attenuated version of the first capability, and wherein the secure enclave is protected from processes executing outside of the secure enclave;

transmitting, by the second server to a separate third server, the first attenuated capability associated with the resource; and transmitting, by the third server to the first server, the first attenuated capability so as to access the associated resource by the third server.

10. The non-transitory computer readable storage medium of claim 9, wherein the first attenuated capability is an encrypted attenuated capability, the method further comprising encrypting the first attenuated capability, by the agent, using an encryption key of the first server.

11. The non-transitory computer readable storage medium of claim 10, the method further comprising, validating by the first server the first attenuated capability by using the encryption key.

12. The non-transitory computer readable storage medium of claim 9, wherein the resource is a region of memory, a file, a network socket, a region of storage, an interrupt vector, or space of a field-programmable gate array (FPGA).

13. The non-transitory computer readable storage medium of claim 9, wherein the agent is instantiated on the second server upon boot up of both the first server and the second server.

14. The non-transitory computer readable storage medium of claim 9, wherein data within the secure enclave cannot be accessed by an operating system of the second server.

15. The non-transitory computer readable storage medium of claim 9, wherein the creating does not use a processor of the first server.

16. The non-transitory computer readable storage medium of claim 9, the method further comprising creating a second attenuated capability by a separate second agent of the first server instantiated on the third server, which executes within a separate second secure enclave of a separate second memory of the third server, wherein the second attenuated capability is an attenuated version of the first attenuated capability, and wherein the second secure enclave is protected from processes executing outside the second secure enclave;

transmitting, by the third server to a separate fourth server, the second attenuated capability associated with the resource; and transmitting, by the fourth server to the first server, the second attenuated capability so as to access the associated resource by the fourth server.

17. A computer system configured to grant a first attenuated capability comprising:

a first server;

a second server different from the first server;

a resource located on the first server;

a memory of the second server; and a physical processor, wherein the physical processor is programmed to carry out a method of granting the first attenuated capability, the method comprising:

providing, by the first server to the second server, a first capability associated with the resource located on the first server;

creating the first attenuated capability by an agent of the first server instantiated on the second server, which executes within a secure enclave of the memory of the second server, wherein the first attenuated capability is an attenuated version of the first capability, and wherein the secure enclave is protected from processes executing outside of the secure enclave;

transmitting, by the second server to a separate third server, the first attenuated capability associated with the resource; and transmitting, by the third server to the first server, the first attenuated capability so as to access the associated resource by the third server.

18. The computer system of claim 17, wherein the first attenuated capability is an encrypted attenuated capability, the method further comprising encrypting the first attenuated capability, by the agent, using an encryption key of the first server.

19. The computer system of claim 18, the method further comprising, validating by the first server the first attenuated capability by using the encryption key.

20. The computer system of claim 17, wherein the resource is a region of memory, a file, a network socket, a region of storage, an interrupt vector, or space of a field-programmable gate array (FPGA).

* * * * *